US010942947B2

(12) United States Patent
Colgrove et al.

(10) Patent No.: US 10,942,947 B2
(45) Date of Patent: Mar. 9, 2021

(54) SYSTEMS AND METHODS FOR DETERMINING RELATIONSHIPS BETWEEN DATASETS

(71) Applicant: Palantir Technologies Inc., Palo Alto, CA (US)

(72) Inventors: Caitlin Colgrove, Palo Alto, CA (US); Harsh Pandey, New York, NY (US); Gabrielle Javitt, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 2 days.

(21) Appl. No.: 15/900,289

(22) Filed: Feb. 20, 2018

(65) Prior Publication Data

US 2019/0018889 A1 Jan. 17, 2019

Related U.S. Application Data

(60) Provisional application No. 62/533,517, filed on Jul. 17, 2017.

(51) Int. Cl.
*G06F 16/28* (2019.01)
*G06F 16/23* (2019.01)
*G06F 16/2455* (2019.01)

(52) U.S. Cl.
CPC ......... *G06F 16/284* (2019.01); *G06F 16/23* (2019.01); *G06F 16/2456* (2019.01)

(58) Field of Classification Search
CPC ......... G06F 17/30498; G06F 17/30454; G06F 17/30466; G06F 16/2456; G06F 16/24544;

(Continued)

(56) References Cited

U.S. PATENT DOCUMENTS 4,881,179 A 11/1989 Vincent
5,241,625 A 8/1993 Epard et al.
(Continued)

FOREIGN PATENT DOCUMENTS

AU 2013251186 11/2015
CN 102054015 5/2014
(Continued)

OTHER PUBLICATIONS

"GrabUp—What a Timesaver!" <http://atlchris.com/191/grabup/>, Aug. 11, 2008, pp. 3.
(Continued)

*Primary Examiner* — Yuk Ting Choi
(74) *Attorney, Agent, or Firm* — Sheppard Mullin Richter & Hampton LLP

(57) ABSTRACT

A first dataset from one or more databases and a second dataset from the one or more databases may be identified. The first dataset may contain first data while the second dataset may contain second data. A first relationship measure may be computed for the first dataset, where the first relationship measure is configured to represent the first data in a first condensed format. A second relationship measure may be computed for the second dataset, where the second relationship measure is configured to represent the second data in a second condensed format. A join key may be computed using the first relationship measure and the second relationship measure. The join key may represent a correspondence area between the first dataset and the second dataset. An interactive user interface element may be configured to display a graphical depiction of the correspondence area between the first dataset and the second dataset.

20 Claims, 8 Drawing Sheets

(58) Field of Classification Search
CPC ...... G06F 16/221; G06F 16/30; G06F 16/284;
G06F 16/23; G06F 16/904; G06F 16/93;
G06F 16/954; G06F 16/2246
See application file for complete search history.

(56) References Cited

U.S. PATENT DOCUMENTS

| | | |
|---|---|---|
| 5,845,300 A | 12/1998 | Comer |
| 5,999,911 A | 12/1999 | Berg et al. |
| 6,065,026 A | 5/2000 | Cornelia et al. |
| 6,101,479 A | 8/2000 | Shaw |
| 6,232,971 B1 | 5/2001 | Haynes |
| 6,237,138 B1 | 5/2001 | Hameluck et al. |
| 6,243,706 B1 | 6/2001 | Moreau et al. |
| 6,279,018 B1 | 8/2001 | Kudrolli et al. |
| 6,370,538 B1 | 4/2002 | Lamping et al. |
| 6,430,305 B1 | 8/2002 | Decker |
| 6,523,019 B1 | 2/2003 | Borthwick |
| 6,642,945 B1 | 11/2003 | Sharpe |
| 6,665,683 B1 | 12/2003 | Meltzer |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,086,028 B1 | 8/2006 | Davis et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,441,182 B2 | 10/2008 | Beilinson et al. |
| 7,441,219 B2 | 10/2008 | Perry et al. |
| 7,627,812 B2 | 12/2009 | Chamberlain et al. |
| 7,634,717 B2 | 12/2009 | Chamberlain et al. |
| 7,716,140 B1 | 5/2010 | Nielsen et al. |
| 7,765,489 B1 | 7/2010 | Shah |
| 7,770,100 B2 | 8/2010 | Chamberlain et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,191,005 B2 | 5/2012 | Baier et al. |
| 8,225,201 B2 | 7/2012 | Michael |
| 8,290,838 B1 | 10/2012 | Thakur et al. |
| 8,302,855 B2 | 11/2012 | Ma et al. |
| 8,312,367 B2 | 11/2012 | Foster |
| 8,392,556 B2 | 3/2013 | Goulet et al. |
| 8,527,949 B1 | 9/2013 | Pleis et al. |
| 8,620,641 B2 | 12/2013 | Farnsworth et al. |
| 8,682,696 B1 | 3/2014 | Shanmugam |
| 8,688,573 B1 | 4/2014 | Ruknoic et al. |
| 8,732,574 B2 | 5/2014 | Burr et al. |
| 8,799,313 B2 | 8/2014 | Satlow |
| 8,807,948 B2 | 8/2014 | Luo et al. |
| 8,930,874 B2 | 1/2015 | Duff et al. |
| 8,938,686 B1 | 1/2015 | Erenrich et al. |
| 8,984,390 B2 | 3/2015 | Aymeloglu et al. |
| 9,058,315 B2 | 6/2015 | Burr et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 2001/0021936 A1 | 9/2001 | Bertram |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason et al. |
| 2003/0093755 A1 | 5/2003 | O'Carroll |
| 2003/0126102 A1 | 7/2003 | Borthwick |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0205492 A1 | 10/2004 | Newsome |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0125715 A1 | 6/2005 | Di Franco et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0018986 A1 | 1/2007 | Hauser |
| 2007/0043686 A1 | 2/2007 | Teng et al. |
| 2007/0061752 A1 | 3/2007 | Cory |
| 2007/0113164 A1 | 5/2007 | Hansen et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0219952 A1* | 9/2007 | Ahmed ............ G06F 16/24537 707/999.002 |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0249820 A1 | 10/2008 | Pathria |
| 2008/0276167 A1 | 11/2008 | Michael |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0164934 A1 | 6/2009 | Bhattiprolu et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0057622 A1 | 3/2010 | Faith et al. |
| 2010/0070842 A1 | 3/2010 | Aymeloglu et al. |

(56) References Cited

U.S. PATENT DOCUMENTS

| | | |
|---|---|---|
| 2010/0070844 A1 | 3/2010 | Aymeloglu et al. |
| 2010/0076813 A1 | 3/2010 | Ghosh et al. |
| 2010/0098318 A1 | 4/2010 | Anderson |
| 2010/0122152 A1 | 5/2010 | Chamberlain et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306722 A1 | 12/2010 | LeHoty et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0055264 A1 | 2/2013 | Burr et al. |
| 2013/0097482 A1 | 4/2013 | Marantz et al. |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0151502 A1* | 6/2013 | Yoon .................. G06F 17/30498 707/714 |
| 2013/0166480 A1 | 6/2013 | Popescu et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2014/0089339 A1 | 3/2014 | Siddiqui et al. |
| 2014/0129936 A1 | 5/2014 | Richards et al. |
| 2014/0156635 A1* | 6/2014 | Grochowski ..... G06F 17/30466 707/714 |
| 2014/0208281 A1 | 7/2014 | Ming |
| 2014/0222793 A1 | 8/2014 | Sadkin et al. |
| 2014/0244284 A1 | 8/2014 | Smith |
| 2014/0280143 A1* | 9/2014 | Milenova .............. G06F 16/285 707/737 |
| 2014/0358829 A1 | 12/2014 | Hurwitz |
| 2015/0026622 A1 | 1/2015 | Roaldson et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |
| 2017/0024384 A1* | 1/2017 | Kant .................. G06F 16/51 707/999.003 |
| 2018/0039399 A1* | 2/2018 | Kaltegaertner ..... G06F 3/04842 707/714 |
| 2018/0046674 A1* | 2/2018 | Grochowski ..... G06F 17/30466 707/714 |
| 2018/0074786 A1* | 3/2018 | Oberbreckling .......... G06F 7/02 707/714 |
| 2018/0075104 A1* | 3/2018 | Oberbreckling .. G06F 17/30498 707/714 |
| 2018/0075115 A1* | 3/2018 | Murray ............. G06F 17/30554 707/714 |

FOREIGN PATENT DOCUMENTS

| | | |
|---|---|---|
| EP | 1672527 | 6/2006 |
| EP | 2993595 | 3/2016 |
| EP | 3002691 | 4/2016 |
| EP | 3009943 | 4/2016 |
| EP | 3032441 | 6/2016 |
| WO | WO 01/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2012/119008 | 9/2012 |

OTHER PUBLICATIONS

"Remove a Published Document or Blog Post," Sharing and Collaborating on Blog Post.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Bluttman et al., "Excel Formulas and Functions for Dummies," 2005, Wiley Publishing, Inc., pp. 280, 284-286.
Chaudhuri et al., "An Overview of Business Intelligence Technology," Communications of the ACM, Aug. 2011, vol. 54, No. 8.
Conner, Nancy, "Google Apps: The Missing Manual," May 1, 2008, pp. 15.
Ferreira et al., "A Scheme for Analyzing Electronic Payment Systems," Basil 1997.
Galliford, Miles, "SnagIt Versus Free Screen Capture Software: Critical Tools for Website Owners," <http://www.subhub.com/articles/free-screen-capture-software>, Mar. 27, 2008, pp. 11.
Gu et al., "Record Linkage: Current Practice and Future Directions," Jan. 15, 2004, pp. 32.
Hua et al., "A Multi-attribute Data Structure with Parallel Bloom Filters for Network Services", HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt 8.1.0 Print Out 2," Software release date Jun. 15, 2006, pp. 1-3.

(56) References Cited

OTHER PUBLICATIONS

SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.

* cited by examiner

JOIN — 600A

CURRENT SET
Current Set
6560 Rows, 27 Columns
Add prefix to column numbers

INCOMING SET
Incoming Dataset
6532 Rows, 17 Columns
Add prefix to column numbers Auto  Manual

MATCH COLUMNS

| Field0 ▽ | —93% match— | Name ▽ |
| 100% unique, 0% null | | 99% unique, 0% null |

⊕ Add pair

JOIN OPTIONS — 402

— 802
| Left | Inner | Outer | Right |

Left Join
Keep all 6560 rows from current dataset and match with 5171 rows from incoming dataset.
☑ Remove duplicate rows from result — 604

Current Set  Incoming Dataset
6276 rows
349 rows
2018 rows
— 606

---

JOIN

CURRENT SET
Current Set
6560 Rows, 27 Columns
Add prefix to column numbers

INCOMING SET
Incoming Dataset
6532 Rows, 17 Columns
Add prefix to column numbers Auto  Manual

MATCH COLUMNS

| Field0 ▽ | —93% match— | Name ▽ |
| 100% unique, 0% null | | 99% unique, 0% null |

⊕ Add pair

JOIN OPTIONS
— 402
| Left | Inner | Outer | Right |

Outer Join — 608
Keep all 6560 rows from current dataset and add 2018 unmatched rows from incoming dataset.
☑ Remove duplicate rows from result — 610

Current Set  Incoming Dataset
6276 rows
349 rows
2018 rows
— 612

Left outer join with Incoming Dataset where Category1 matches Category2

FIG. 6A

JOIN

CURRENT SET
Current Set
6560 Rows, 27 Columns
Add prefix to column numbers

INCOMING SET
Incoming Dataset
6532 Rows, 17 Columns
Add prefix to column numbers Auto Manual

MATCH COLUMNS

Field0 ▾ —— 93% match —— Name ▾
100% unique, 0% null    99% unique, 0% null
⊕ Add pair

JOIN OPTIONS — 402

| Left | Inner | Outer | Right | — 614

Right Join
Keep all 5032 rows from incoming dataset and match with 6276 rows from current dataset.
☑ Remove duplicate rows from result — 616

Current Set  Incoming Dataset
6276 rows
349 rows
2018 rows
— 618

JOIN

CURRENT SET
Current Set
6560 Rows, 27 Columns
Add prefix to column numbers

INCOMING SET
Incoming Dataset
6532 Rows, 17 Columns
Add prefix to column numbers Auto Manual

MATCH COLUMNS

Field0 ▾ —— 93% match —— Name ▾
100% unique, 0% null    99% unique, 0% null
⊕ Add pair

JOIN OPTIONS
— 620  — 402

| Left | Inner | Outer | Right |

Inner Join
Keep 5171 rows found in both datasets.
☑ Remove duplicate rows from result — 622

Current Set  Incoming Dataset
6276 rows
349 rows
2018 rows
— 624

Left outer join with Incoming Dataset where Category1 matches Category2

SYSTEMS AND METHODS FOR DETERMINING RELATIONSHIPS BETWEEN DATASETS

CROSS REFERENCE TO RELATED APPLICATIONS

This application claims the benefit under 35 U.S.C. § 119(e) of U.S. Provisional Application Ser. No. 62/533,517 filed Jul. 17, 2017, the content of which is incorporated by reference in its entirety into the present disclosure.

BACKGROUND

Technical Field

This disclosure relates to approaches for determining relationships between datasets, and more particularly, for determining relationships between datasets using relationship measures.

Description of Related Art

Combining datasets may involve identifying the datasets, and then joining the datasets. Joining the datasets may involve performing a join operation. Examples of join operations include left join operations, right join operations, inner join operations, and outer/full join operations. Unfortunately, many join operations involve complex computations, particularly when joining data from structured and/or large-scale databases. Many conventional systems require these join operations to be performed up-front, often before a user has a chance to evaluate whether the datasets are comparable. Thus, conventional approaches may make it difficult to identify the datasets that can be joined together. Conventional approaches may also limit the flexibility of users who have not decided whether they want to perform a join operation on those datasets.

SUMMARY

Various embodiments of the present disclosure include systems, methods, and non-transitory computer readable media configured to identify a first dataset from one or more databases and a second dataset from the one or more databases, the first dataset having first data, and the second dataset having second data. A first relationship measure may be computed for the first dataset, where the first relationship measure is configured to represent the first data in a first condensed format. A second relationship measure may be computed for the second dataset, where the second relationship measure is configured to represent the second data in a second condensed format. A join key may be computed using the first relationship measure and the second relationship measure, where the join key represents a correspondence area between the first dataset and the second dataset. An interactive user interface element may be configured to display a graphical depiction of the correspondence area between the first dataset and the second dataset.

In some embodiments, the instructions cause the system to perform computing an overlap suggestion measure, the overlap suggestion measure including join suggestion information to suggest a join operation to join the first dataset and the second dataset, and the overlap suggestion measure being based on the first relationship measure and the second relationship measure. The overlap suggestion measure may comprise a null measure to identify a null portion of the first dataset or the second dataset.

The overlap suggestion measure may comprise one or more of: a first uniqueness measure configured to identify a first unique portion of the first dataset, and a second uniqueness measure configured to identify a second unique portion.

The instructions may cause the system to perform configuring the interactive user interface element to display the overlap suggestion measure.

In some embodiments, the first relationship measure is based on a first hash value of the first data in the first dataset. The second relationship measure may be based on a second hash value of the second data in the second dataset.

The correspondence area may comprise a left correspondence area configured to represent the first dataset and left matching data from the second dataset, the left matching data matching at least a portion of the first dataset.

The correspondence area may comprise a right correspondence area configured to represent the second dataset and right matching data from the first dataset, the right matching data matching at least a portion of the second dataset. The correspondence area may comprise an inner correspondence area configured to represent inner matching data representing only an overlapping portion of the first dataset and the second dataset.

The correspondence area may comprise an outer correspondence area configured to represent outer matching data representing the first dataset and the second dataset.

In some embodiments, the first dataset comprises a first column of a first database of the one or more databases. The second dataset may comprise a second column of a second database of the one or more databases. These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 6A is a diagram of two screen captures of a graphical user interface configured to display a join operation board of a correspondence area between a first dataset and a second dataset, per some embodiments.

FIG. 6B is a diagram of two screen captures of a graphical user interface configured to display a join operation board of a correspondence area between a first dataset and a second dataset, per some embodiments.

DETAILED DESCRIPTION

A claimed solution rooted in computer technology overcomes problems with modeling correspondence of datasets that specifically arise in the realm of database and other computer technologies. Through selection or an automated agent, a user may identify datasets from database(s). The datasets may include database columns the user wants to combine using a join operation. Relationship measures that represent data in the datasets in a condensed format may be calculated for each dataset. The relationship measures may correspond to a hash or other condensed representation of the values in the datasets. A join key that represents correspondence areas between the datasets may be calculated based on the relationship measures. An interactive user interface element may be configured to display a graphical depiction of any correspondence areas between the datasets. In some implementations, the user interface element may be configured to display overlap suggestion measures, such as the extent that specific datasets contain null data and/or unique data, to suggest join operations to join the datasets. Advantageously, the relationship measures may allow a user to estimate correspondence areas even when primary keys, foreign keys, and/or other keys used to join datasets are unknown and/or not readily available.

Figure 1:
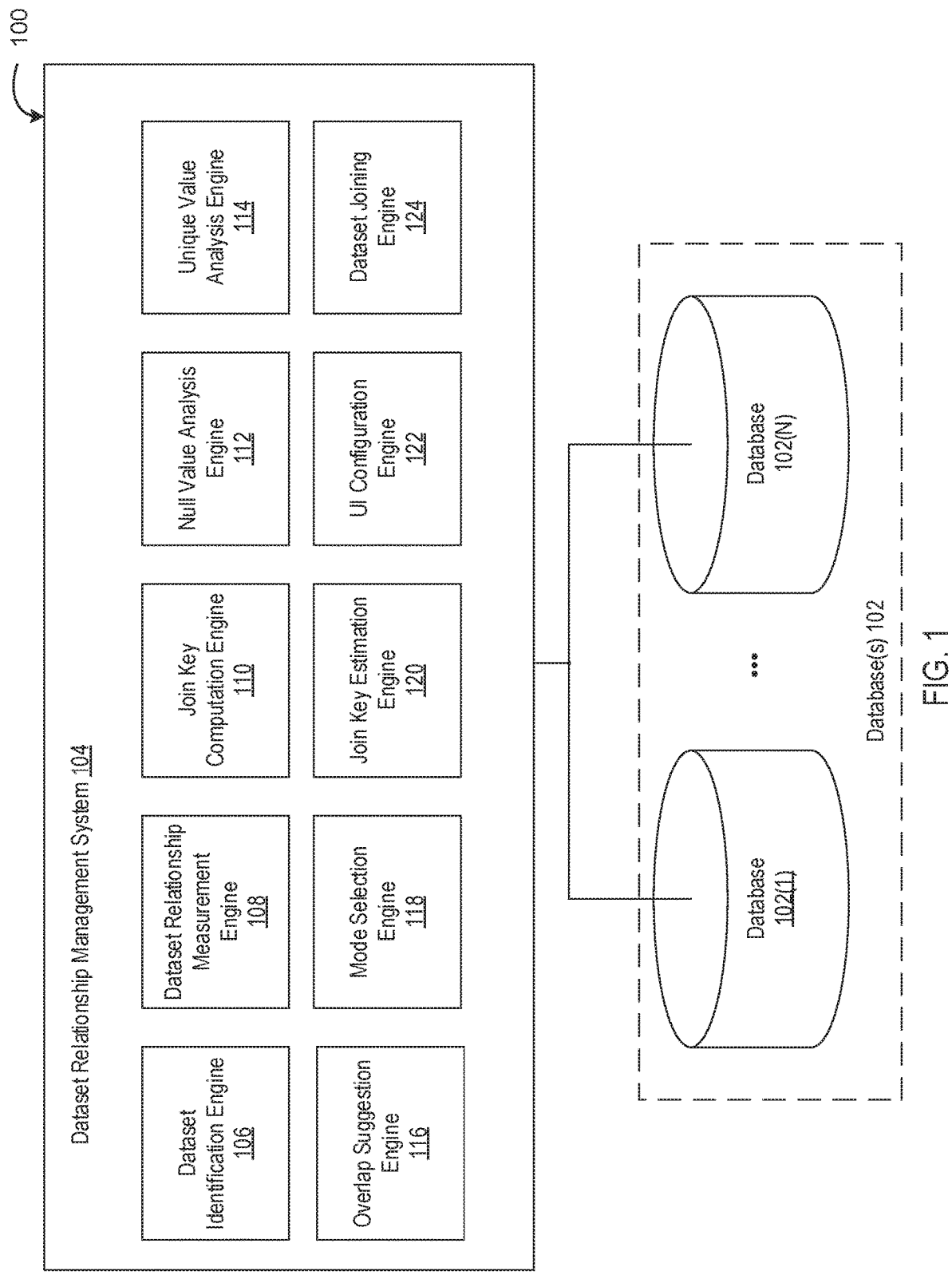
FIG. 1 is a diagram of an example of a dataset relationship management environment, per some embodiments.

FIG. 1 is a diagram of an example of a dataset relationship management environment 100, per some embodiments. The dataset relationship management environment 100 shown in FIG. 1 includes one or more database(s) 102 (shown as a first database 102(1) through an Nth database 102(N) (where "N" may represent an arbitrary integer)) and a dataset relationship management system 104. The database(s) 102 and the dataset relationship management system 104 may be coupled to one another through one or more computer networks (e.g., LAN, WAN, or the like) or another transmission media. The computer networks and/or transmission media may provide communication between the database(s) 102 and the dataset relationship management system 104 and/or between components in those systems. Communication networks and transmission mediums are discussed further herein.

The database(s) 102 may include one or more databases configured to store data. The database(s) 102 may include tables, comma-separated values (CSV) files, structured databases (e.g., those structured in Structured Query Language (SQL)), or other applicable known or convenient organizational formats. The database(s) 102 may support queries and/or other requests for data from other modules, such as the dataset relationship management system 104. In some embodiments, the database(s) 102 may provide stored data in response to the queries/requests. The databases may include "datasets," which as used herein, may refer to collections of data within a database. A dataset may include all data in a database that follows a specific format or structure. As an example, a dataset may include a column or a row or a database. A dataset may also include any arbitrary collection of data, such as a specific collection of data identified by a user or an automated agent. The database(s) 102 may store datasets in similar or different formats.

The dataset relationship management system 104 may include modules configured to measure and graphically represent relationships and/or overlaps between datasets. The dataset relationship management system 104 includes a dataset identification engine 106, a dataset relationship measurement engine 108, a join key computation engine 110, null value analysis engine 112, a unique value analysis engine 114, an overlap suggestion engine 116, a mode selection engine 118, a join operation estimation engine 120, and a user interface (UI) configuration engine 122, and a dataset joining engine 124.

The dataset identification engine 106 may be configured to identify datasets of interest in the database(s) 102. The dataset identification engine 106 may be configured to execute specific queries to identify datasets from the database(s) 102. In some embodiments, the dataset identification engine 106 identifies first and second datasets from the database(s) 102. The first dataset may include first data, and the second dataset may include second data. The first data and the second data may be completely distinct from one another, have portions that overlap with each other, or may completely overlap with one another. In some embodiments, the first dataset comprises a "primary dataset" and the second dataset comprises a "secondary dataset" to be joined to the primary dataset through left join, right join, inner join, or full join operations.

In some embodiments, the dataset identification engine 106 is configured to identify columns of two or more databases in the database(s) 102. The dataset identification engine 106 may be configured to identify rows of two or more databases in the database(s) 102. In various embodiments, the dataset identification engine 106 is configured to identify datasets that match date and/or time ranges, are responsive to keyword searches, fall within subject areas of interest, are responsive other structured and/or unstructured queries, and/or the like. In some implementations, the dataset identification engine 106 receives instructions from a user to identify the datasets of interest. The dataset identification engine 106 may also receive instructions from automated agents, such as automated processes executed on the dataset relationship management system 104, to identify the datasets of interest. The dataset identification engine 106 may provide the identified datasets of interest to one or more other modules, including but not limited to the dataset relationship management engine 108.

The dataset relationship measurement engine 108 may be configured to identify relationship measures of datasets identified by the dataset identification engine 106. A "relationship measure," as used herein, may include a representation of data in a dataset in a condensed format. A "condensed format," as used herein, may include any format that represents data without fully including the data. A relationship measure may include a value that reduces entries of data in a dataset into a number.

In some embodiments, relationship measures may be based on a hash value of data in a dataset. Thus, the dataset relationship measurement engine 108 may be configured to calculate a hash value of data in datasets identified by the dataset identification engine 106. Relationship measures may be based on encrypted and/or encoded values of data in a dataset. In such embodiments, the dataset relationship measurement engine 108 may be configured to calculate encrypted and/or encoded values corresponding to data in a dataset. The dataset relationship measurement engine 108 may provide relationship measures to other modules of the dataset relationship management system 104, including but not limited to the join key computation engine 110, the null value analysis engine 112, and the unique value analysis engine 114.

The join key computation engine 110 may be configured to compute join keys for two or more datasets to be joined. A "join key," as used herein, may include one or more values that provide a basis to join two or more datasets. In some embodiments, the join key computation engine 110 bases a join key on relationship measures of datasets to be joined. As an example, the join key computation engine 110 may base a join key on a comparison of the extent that relationship measures of two datasets overlap and/or correspond with one another.

In embodiments where relationship measures are based on hash values of datasets, the join key computation engine 110 may be configured to compare hash values of datasets to compute join keys. In some embodiments, the join key computation engine 110 bases join keys on relationship measures of only one dataset, such as on the relationship measure of a secondary dataset used as the basis of a right, left, inner, or outer join operation. Advantageously, by using condensed values, the join key computation engine 110 may provide estimates of correspondence areas even when primary keys, foreign keys, and/or other keys used to join datasets are unknown and/or not readily available (e.g., because of the particular database implementation).

The null value analysis engine 112 may be configured to analyze datasets for null values. A "null value," as used herein, may include a value that corresponds to a blank entry and/or other null entry in a dataset. In various embodiments, the null value analysis engine 112 analyzes relationship measures of datasets computed by the dataset relationship measurement engine 108 to determine null values in those datasets. The null value analysis engine 112 may, for instance, analyze hash values of datasets that were computed by the dataset relationship measurement engine 108 to determine null measures (e.g., amounts and/or percentage(s)) of entries in those datasets that contain null values. The null value analysis engine 112 may provide null values and/or null measures of datasets to other modules, such as the overlap suggestion engine 116.

The unique value analysis engine 114 may be configured to analyze datasets for unique values. A "unique value," as used herein, may include an entry in a dataset that lacks duplicates in that dataset. In some embodiments, the unique value analysis engine 114 analyzes relationship measures of datasets computed by the dataset relationship measurement engine 108 to determine unique values in those datasets. The unique value analysis engine 114 may, for instance, analyze hash values of datasets that were computed by the dataset relationship measurement engine 108 to determine uniqueness measures (e.g., amounts and/or percentage(s)) of entries in those datasets that contain unique values. The unique value analysis engine 114 may provide unique values and/or uniqueness measures of datasets to other modules, such as the overlap suggestion engine 116.

The overlap suggestion engine 116 may be configured to compute an overlap suggestion measure for two or more datasets. An "overlap suggestion measure," as used herein, may include a value that represents the extent that two or more datasets are likely to overlap with one another. In some embodiments, an overlap suggestion measure is based on relationship measures between datasets. As an example, an overlap suggestion measure may be based on the hash values, encrypted values, encoded values, etc., in two or more datasets that correspond with one another. In various embodiments, an overlap suggestion measure is based on null measures of datasets, uniqueness measures of datasets, and/or some combination thereof. The overlap suggestion measure computed by the overlap suggestion engine may include join suggestion information, which, as used herein, may include any information to suggest a join operation for two or more datasets. In some embodiments, the overlap suggestion engine 116 functions to provide an approximate measure of overlap between two or more datasets, and/or portions thereof. For example, the overlap suggestion engine 116 may calculate an approximate value (e.g., percentage value, percentage value range) of overlap between two columns in two datasets.

The mode selection engine 118 may be configured to select an automated mode of operation or a manual mode of operation. In an automated mode of operation, an automated agent may select datasets for join operations. In a manual mode, a user may select datasets for join operations. In some implementations, the mode selection engine 118 receives selection of a mode of operation from parts of a user interface, such as from buttons, links, and/or other user elements in a user interface.

The join operation estimation engine 120 may be configured to compute estimates of join operations used to join datasets. An estimate may be based on the extent that relationship measures of two datasets overlap and/or correspond with one another. The join operation estimation engine 120 may use the estimate in an automated mode in which estimates of join keys are suggested to users.

The user interface configuration engine 122 may configure an interactive user interface element to display data related to join operations and/or proposed join operations for datasets. The user interface configuration engine 122 may configure an interactive user interface element to display graphical depictions of datasets used for join operations, including dataset names and/or the number of rows and columns in those datasets. The user interface configuration engine 122 may also configure an interactive user interface element to display graphical depictions of correspondence areas, including correspondence areas based on relationship measures. In some embodiments, the user interface configuration engine 122 configures an interactive user interface element to display graphical depictions of null measures and/or uniqueness measures. Graphical depictions may include icons, menus, radio and/or other buttons, text boxes, selection areas, and/or any relevant graphical user interface elements. The user interface configuration engine 122 may also receive and/or process interactions with user interface elements. In some embodiments, the user interface configuration engine 122 receives and/or processes instructions to join datasets.

The dataset joining engine 124 may be configured to facilitate joining datasets identified by the dataset identification engine 106. The dataset joining engine 124 may base joins on join keys computed by the join key computation engine 110. In some embodiments, the dataset joining engine 124 processes instructions from a UI and/or the UI configuration engine 122.

Figure 2:
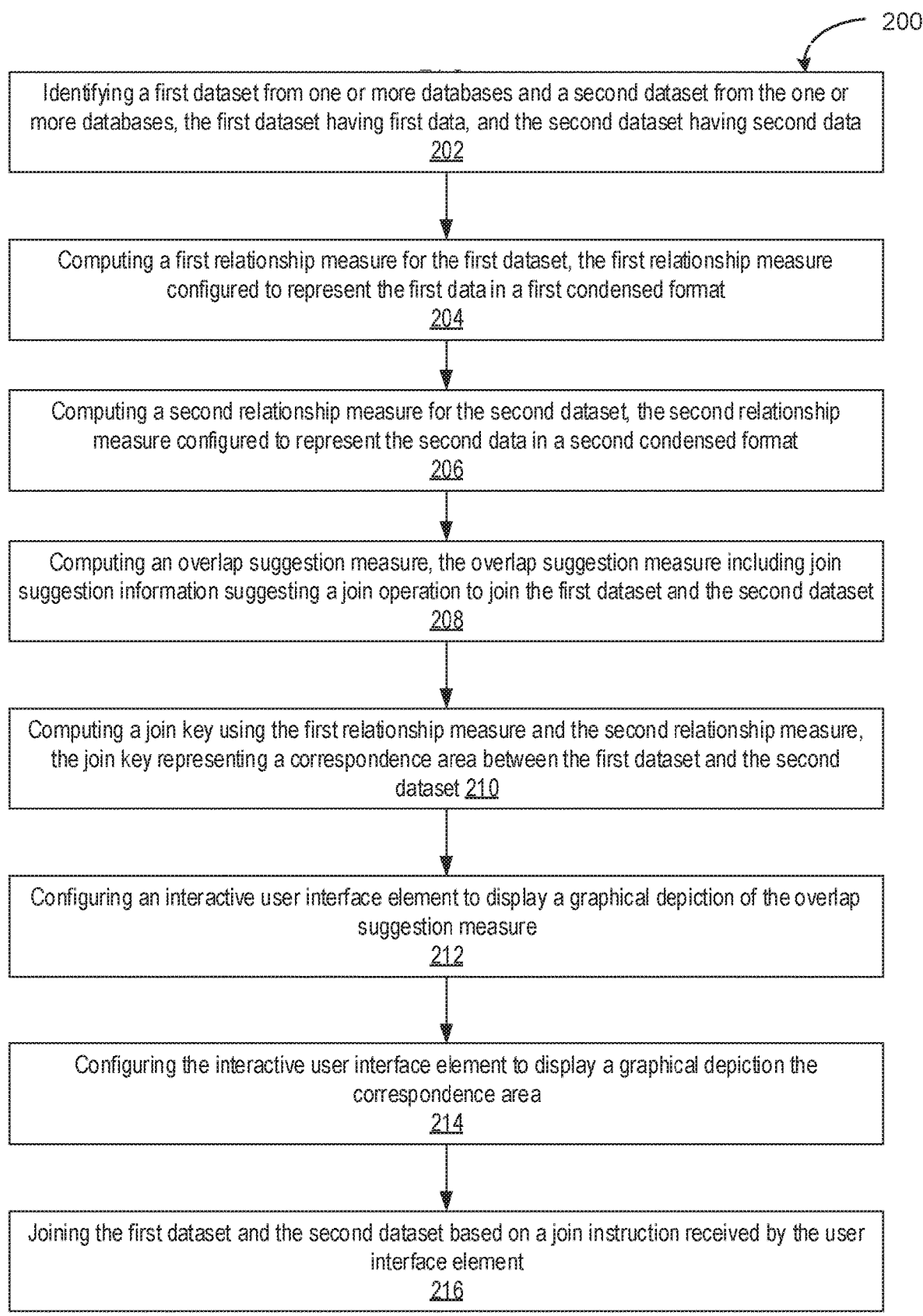
FIG. 2 is a diagram of an example of a method for configuring an interactive user interface element to display a graphical depiction of a correspondence area between a first dataset and a second dataset, per some embodiments.

FIG. 2 is a diagram of an example of a method 200 for configuring an interactive user interface element to display a graphical depiction of a correspondence area between a first dataset and a second dataset, per some embodiments. In this and other flowcharts, the flowchart illustrates by way of example a sequence of operations. It should be understood the operations may be reorganized for parallel execution, or reordered, as applicable. Moreover, some operations that could have been included may have been removed to avoid providing too much information for the sake of clarity and some steps that were included could be removed, but may have been included for the sake of illustrative clarity.

At an operation 202, a first dataset from one or more databases and a second dataset from the one or more databases may be identified. The first dataset may have first data, and the second dataset may have second data. In an illustrative embodiment, the dataset identification engine 106 may identify first and second datasets from the database (s) 102. The first dataset may contain first data and the second dataset may contain second data. The first data and second data may not overlap, may overlap in part, or may wholly overlap. In some embodiments, the first dataset may be stored in the first database 102(1) and the second dataset may be stored in the Nth database 102(N), e.g., the first dataset and the second dataset may be stored in different databases. It is noted that the dataset identification engine 106 may identify more than two datasets, and that, in some embodiments, the dataset identification engine 106 may identify an arbitrary number of datasets. The dataset identification engine 106 may provide the first dataset, the second dataset, and/or other datasets to other modules, such as the dataset relationship management engine 108.

At an operation 204, a first relationship measure may be computed for the first dataset. The first relationship measure may be configured to represent the first data in a first condensed format. The dataset relationship measurement engine 108 may, after receiving the identifier of the first dataset, compute a first relationship measure for the first dataset. In some embodiments, the dataset relationship measurement engine 108 computes a hash value of the first data in the first dataset. The dataset relationship measurement engine 108 may also and/or alternatively compute encrypted and/or encoded values from the first data in the first dataset. The dataset relationship measurement engine 108 may base the first relationship measure on computed hash values, encrypted values, and/or encoded values.

At an operation 206, a second relationship measure may be computed for the second dataset. The second relationship measure may be configured to represent the second data in a second condensed format. The dataset relationship measurement engine 108 may, after receiving the identifier of the second dataset, compute a second relationship measure for the second dataset. The dataset relationship measurement engine 108 may compute a hash value of the second data in the second dataset. The dataset relationship measurement engine 108 may also and/or alternatively compute encrypted and/or encoded values from the second data in the second dataset. The dataset relationship measurement engine 108 may base the second relationship measure on computed hash values, encrypted values, and/or encoded values. The dataset relationship measurement engine 108 may provide the first relationship measure and the second relationship measure to other modules, such as the join key computation engine 110.

At an operation 208, an overlap suggestion measure may be computed. The overlap suggestion measure may include join suggestion information that suggests a join operation to join the first dataset and the second dataset. In example embodiments, the operation 208 may be implemented by one or more of the null value analysis engine 112, the unique value analysis engine 114, and the overlap suggestion engine 116.

The null value analysis engine 112 may evaluate the first data and the second data for the presence or the absence of null values. The null value analysis engine 112 may compute one or more null measures for the first dataset and the second dataset based on this analysis. The unique value analysis engine 114 may further evaluate the first data and the second data for the presence or the absence of unique values. The unique value analysis engine 114 may compute one or more uniqueness measures for the first dataset and the second dataset based on this analysis. The null value analysis engine 112 and/or the unique value analysis engine 114 may provide null measures and/or uniqueness measures to the overlap suggestion engine 116.

The overlap suggestion engine 116 may compute an overlap suggestion measure based on the null measures, the uniqueness measures, or some combination thereof. The overlap suggestion measure may provide the basis to suggest, e.g., left join operations, right join operations, inner join operations, and/or outer/full join operations.

At an operation 210, a join key may be computed using the first relationship measure and the second relationship measure computed by the dataset relationship measurement engine 108. The join key may represent a correspondence area between the first dataset and the second dataset.

In an example embodiment, the join key computation engine 110 may compute a join key using the first relationship measure and the second relationship measure. The join key may represent a correspondence area between the first dataset and the second dataset. In some implementations, the correspondence area may include a left correspondence area that represents the first dataset and left matching data from the second dataset, the left matching data matching at least a portion of the first dataset. The correspondence area may include a right correspondence area that represents the second dataset and right matching data from the first dataset, the right matching data matching at least a portion of the second dataset. The correspondence area may include an inner correspondence area configured to represent inner matching data representing only an overlapping portion of the first dataset and the second dataset. The correspondence area may represent an outer correspondence area configured to represent outer matching data representing the first dataset and the second dataset.

At an operation 212, an interactive user interface element may be configured to display a graphical depiction of the overlap suggestion measure. In some embodiments, the UI configuration engine 122 may configure an interactive user interface element to display a graphical depiction of the overlap suggestion measure.

At an operation 214, the interactive user interface element may be configured to display a graphical depiction the correspondence area. In various embodiments, the UI configuration engine 122 may configure the interactive user interface element to display a graphical depiction of the correspondence area.

At an operation 216, the first dataset and the second dataset may be joined based on a join instruction received by the user interface element. In various embodiments, the UI configuration engine 122 may process instructions to join the first dataset and the second dataset. The dataset joining engine 124 may join the first dataset and the second dataset using the join key computed by the join key computation engine 110. The dataset joining engine 124 may store a joined dataset in the database(s) 102.

Figure 3:
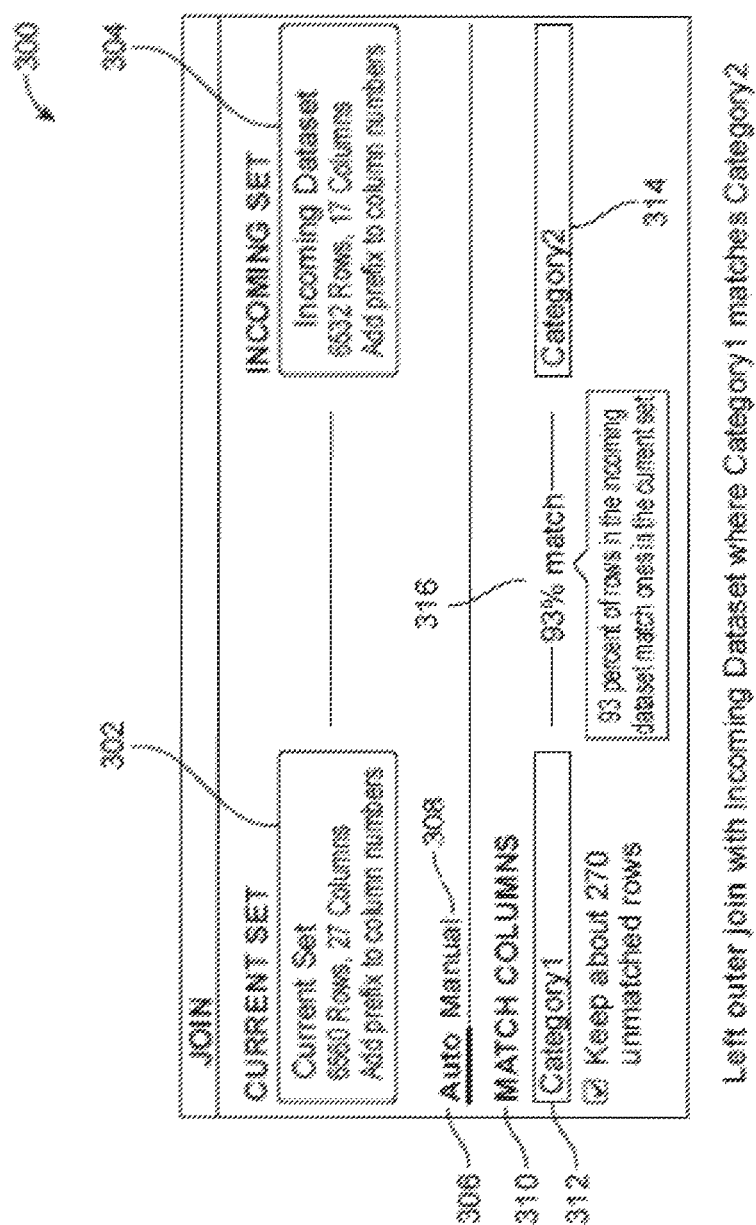
FIG. 3 is a diagram of a screen capture of a graphical user interface configured to display a join operation board of a correspondence area between a first dataset and a second dataset, per some embodiments.

FIG. 3 is a diagram of a screen capture 300 of a graphical user interface configured to display a join operation board of a correspondence area between a first dataset and a second dataset, per some embodiments. The join operation board includes a graphical depiction of proposed join operations between datasets. The join operation may include a current datasets virtual tile 302, an incoming datasets virtual tile 304, an automatic mode button 306, a manual mode button 308, and matching columns virtual tiles 310.

The current datasets virtual tile 302 may include a graphical depiction of first dataset(s) from one or more databases. In this example, the current datasets virtual tile 302 depicts the contents of a first database of which a column is a primary dataset used as the basis of a join operation. In some implementations, the dataset identification engine 106 may have gathered the first database (and/or columns thereof) from one of the database(s) 102. The current datasets virtual tile 302 may allow a user to add a prefix to column names.

The incoming datasets virtual tile 304 may include a graphical depiction of second dataset(s) from one or more databases. In this example, the incoming datasets virtual tile 304 depicts the contents of a second database of which a column is a secondary dataset used as the basis of a join operation. In some implementations, the dataset identification engine 106 may have gathered the second database (and/or columns thereof) from one of the database(s) 102. The incoming datasets virtual tile 304 may allow a user to add a prefix to column names. A hyperlink listing the name of the database may allow a user to select a database by name. In some embodiments, selecting the hyperlink will allow the user to navigate to a local or networked location (e.g., file listing, network location listing, Internet location) that stores the second database.

The automated mode button 306 may include a graphical depiction of an automated mode of operation. In some implementations, the automatic mode button 306 provides an estimate of join keys that can be used for a join operation to join parts of the second database to parts of the first database. The manual mode button 308 may include a graphical depiction of a manual mode of operation, discussed further in the context of FIGS. 4, 5, 6A, and 6B. In various implementations, selection of the automated mode button 306 or the manual mode button 308 may select a mode of operation by the mode selection engine 118.

In the example of FIG. 3, the automated mode button 306 has been selected, and thus, the matching columns virtual tiles 310 is displayed. The matching columns virtual tiles 310 may include a first menu 312 (shown as specifying a column of a primary dataset (entitled "Category")), a second menu 314 (shown as specifying a column of a secondary dataset (entitled "Category2")), and a graphical depiction of an estimated match 316. In this example, the join operation estimation engine 120 has provided an estimate of the extent that columns of the primary dataset and the secondary dataset that are likely to match. As depicted, the join operation estimation engine 120 has provided an estimate that 93% of the data in the primary dataset and the secondary dataset are likely to match.

Figure 4:
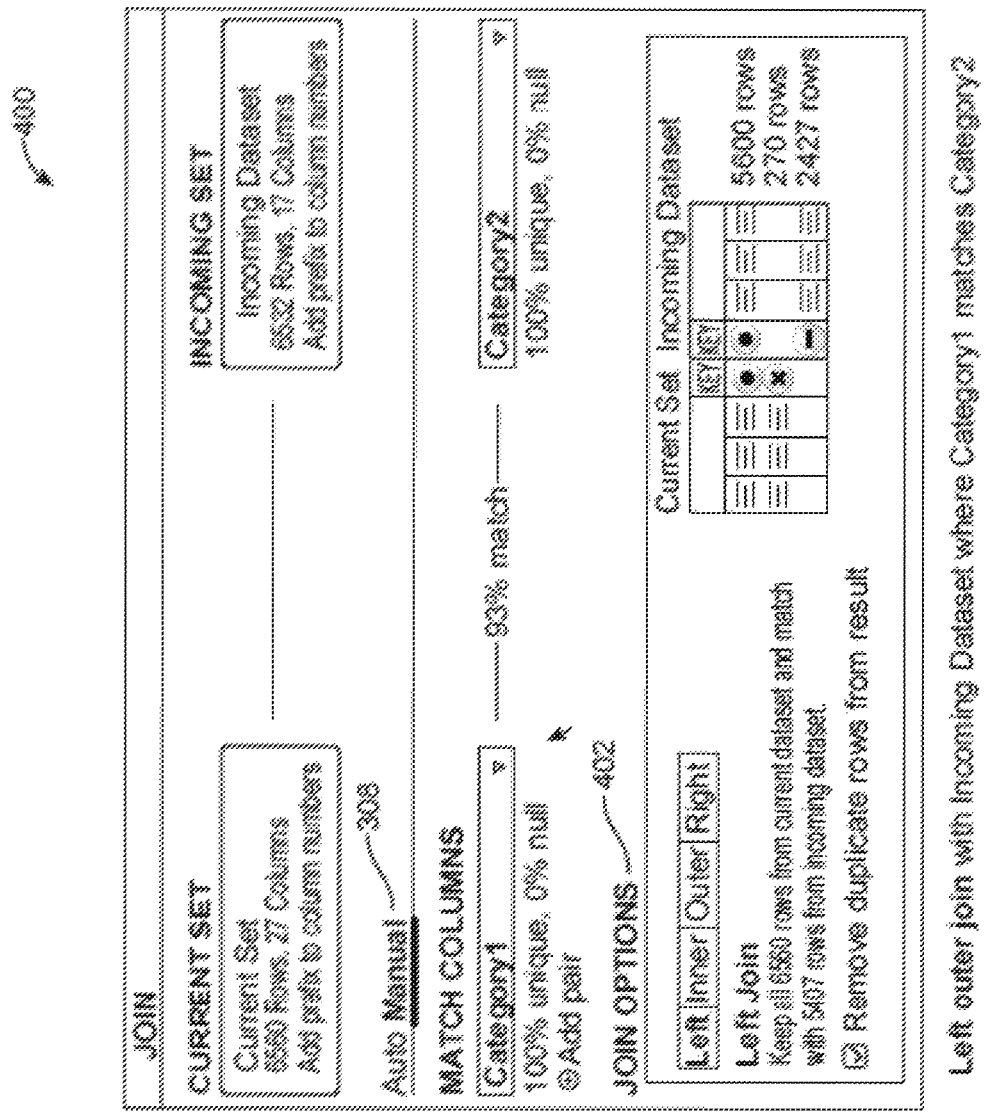
FIG. 4 is a diagram of a screen capture of a graphical user interface configured to display a join operation board of a correspondence area between a first dataset and a second dataset, per some embodiments.

FIG. 4 is a diagram of a screen capture 400 of a graphical user interface configured to display a join operation board of a correspondence area between a first dataset and a second dataset, per some embodiments. In the example of FIG. 4, the manual mode button 308 has been selected, and thus, a join options tile 402 is displayed. The join options tile 402 may allow a user to select a type of join operation to join the primary dataset and the secondary dataset. In this example, the join options tile 402 provides a user with options to select a left join operation, an inner join operation, an outer join operation, and a right join operation.

Figure 5:
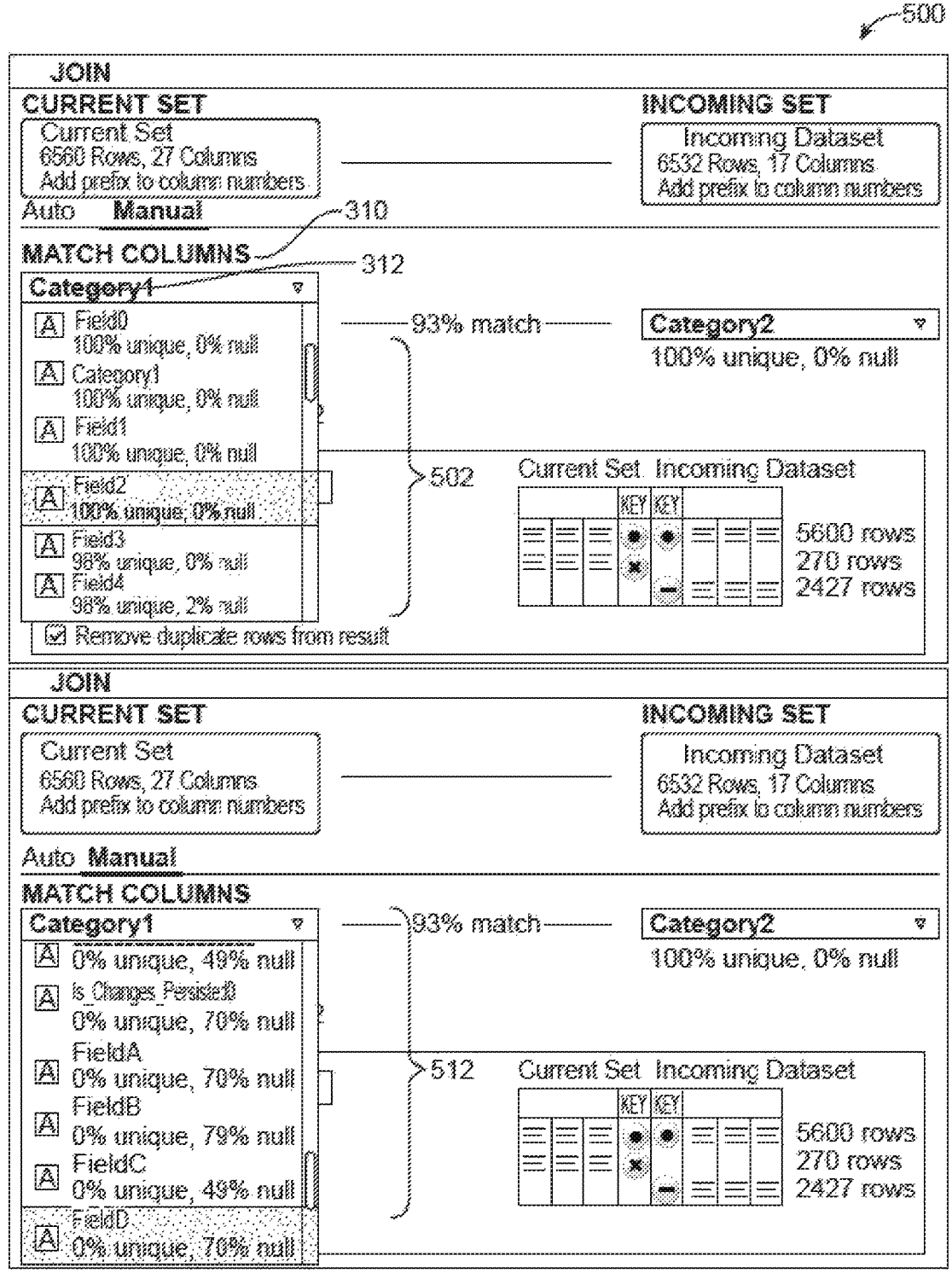
FIG. 5 is a diagram of two screen captures of a graphical user interface configured to display a join operation board of a correspondence area between a first dataset and a second dataset, per some embodiments.

FIG. 5 is a diagram of two screen captures 500 of a graphical user interface configured to display a join operation board of a correspondence area between a first dataset and a second dataset, per some embodiments. In FIG. 5, the user has expanded the first menu 312 and has been provided a first expanded listing 502. The first expanded listing 502 may include each column of the first dataset(s). The first expanded listing 502 may include null measures and/or uniqueness measures associated with each column. In some embodiments, the dataset identification engine 106 may have identified columns of the first dataset(s), the null value analysis engine 112 may have computed null measures for each identified column, and the unique value analysis engine 114 may have computed uniqueness measures for each identified column.

FIG. 5 further shows a second expanded listing, corresponding to the user having scrolled through the first menu 302. In the example of FIG. 5, the first expanded listing 502 includes columns with larger uniqueness measures and/or smaller null measures. The second expanded listing 512 includes columns with smaller uniqueness measures and larger null measures. In this example, the columns in the first menu 302 have been ranked by uniqueness measures and/or null measures, which advantageously provides a user with the ability to manually identify which columns are good candidates for a join operation.

FIG. 6A is a diagram of two screen captures 600A of a graphical user interface configured to display a join operation board of a correspondence area between a first dataset and a second dataset, per some embodiments. The screen capture on the left side of FIG. 6A shows graphical depictions of join operations. A left join button 602 has been selected, causing a left join informational portion 604 to be displayed. Also displayed is a left join graphical table 606 graphically displaying the result of a left join operation. The screen capture on the right side of FIG. 6A shows an outer join button 608 having been selected, causing an outer join information portion 610 and an outer join graphical table 612 to be displayed. FIG. 6B is a diagram of two screen captures 600B of a graphical user interface configured to display a join operation board of a correspondence area between a first dataset and a second dataset, per some embodiments. The screen capture on the left side of FIG. 6B shows a right join button 614 having been selected, causing a right join information portion 616 and a right join graphical table 618 to be displayed. Similarly, the screen capture on the right side of FIG. 6B shows an inner join button 620 having been selected, causing an inner join information portion 622 and an inner join graphical table 624 to be displayed.

Hardware Embodiment

Figure 7:
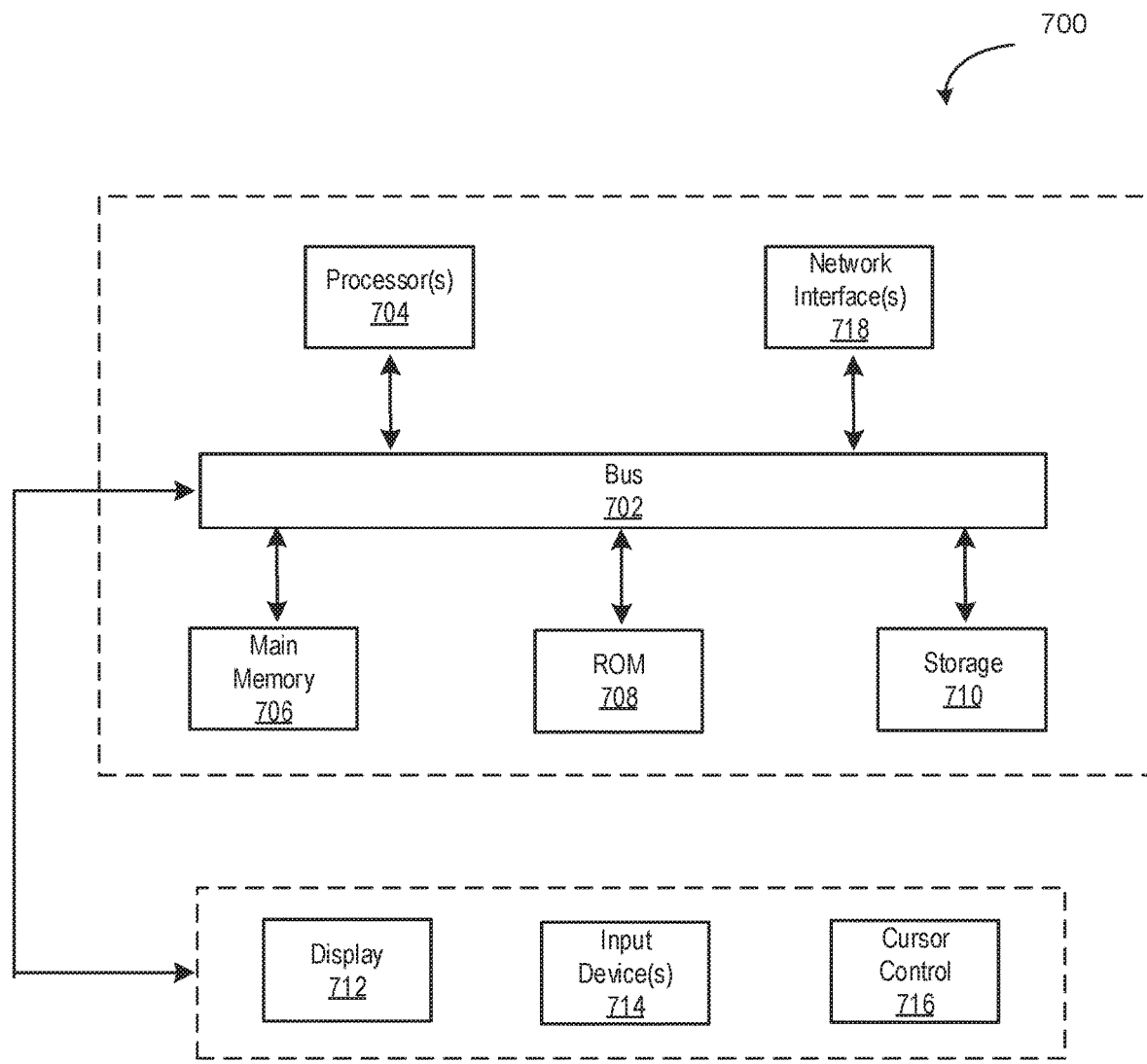
FIG. 7 depicts a block diagram of an example of a computer system upon which any of the embodiments described herein may be implemented.

FIG. 7 depicts a block diagram of an example of a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be included of connected logic units, such as gates and flip-flops, and/or may be included of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. Per one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may include non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface

718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such embodiment, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may include software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may include more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
one or more processors; and
memory storing instructions that, when executed by the one or more processors, cause the system to perform:
identifying a first dataset from one or more databases and a second dataset from the one or more databases, the first dataset having first data, and the second dataset having second data;
condensing the first data into first condensed data, the condensing the first data including applying a hash function to the first dataset, the first condensed data comprising first hash values generated from the applying the hash function to the first dataset;
condensing the second data into second condensed data, the condensing the second data including applying the hash function to the second dataset, the second condensed data comprising second hash values generated from the applying the hash function to the second dataset;
determining proportions of unique values in each of columns in the first dataset and the second dataset based on the first hash values and the second hash values;
estimating a degree of overlap between a column of the columns in the first dataset and a column of the columns of the second dataset based on the first hash values and the second hash values, and based on the proportions of entries having unique values in each of the columns in the first dataset and the second dataset;
determining parameters for any one or more of a left join, an inner join, an outer join, and a right join operation, the parameters comprising:
numbers of rows to keep, match, or add from the first dataset; and
numbers of rows to keep, match, or add from the second dataset,
the determined parameters being based at least in part on the proportions of entries having unique values; and
suggesting a join operation, from any one or more of the left join, the inner join, the outer join, and the right join, based on any of:
the proportions of unique values in each of the columns; and
the estimated degree of overlap;
computing a first relationship measure for the first dataset, the first relationship measure including the first condensed data;
computing a second relationship measure for the second dataset, the second relationship measure including the second condensed data;
computing a join key using the first relationship measure and the second relationship measure, and using the determined parameters, the join key representing a correspondence area between the first dataset and the second dataset; and
selecting an operation, from any one or more of the left join, the inner join, the outer join, and the right join, based on the join key.

2. The system of claim 1, wherein the join operation is suggested based on an overlap suggestion measure based on the first relationship measure and the second relationship measure.

3. The system of claim 2, wherein the overlap suggestion measure comprises a null measure to identify a null portion of the first dataset or the second dataset.

4. The system of claim 2, wherein the overlap suggestion measure comprises one or more of: a first uniqueness measure configured to identify a first unique portion of the first dataset, and a second uniqueness measure configured to identify a second unique portion.

5. The system of claim 2, wherein the instructions cause the system to perform configuring an interactive user interface element to display the overlap suggestion measure.

6. The system of claim 1, wherein the first relationship measure is based on a first hash value of the first data in the first dataset.

7. The system of claim 1, wherein the second relationship measure is based on a second hash value of the second data in the second dataset.

8. The system of claim 1, wherein the correspondence area comprises one or more of:
a left correspondence area configured to represent the first dataset and left matching data from the second dataset, the left matching data matching at least a portion of the first dataset;
a right correspondence area configured to represent the second dataset and right matching data from the first dataset, the right matching data matching at least a portion of the second dataset;
an inner correspondence area configured to represent inner matching data representing only an overlapping portion of the first dataset and the second dataset; and
an outer correspondence area configured to represent outer matching data representing the first dataset and the second dataset.

9. The system of claim 1, wherein the first dataset comprises a first column of a first database of the one or more databases.

10. The system of claim 9, wherein the second dataset comprises a second column of a second database of the one or more databases.

11. A method being implemented by a computing system including one or more physical processors and storage media storing machine-readable instructions, the method comprising:

identifying a first dataset from one or more databases and a second dataset from the one or more databases, the first dataset having first data, and the second dataset having second data;

condensing the first data into first condensed data, the condensing the first data including applying a hash function to the first dataset, the first condensed data comprising first hash values generated from the applying the hash function to the first dataset;

condensing the second data into second condensed data, the condensing the second data including applying the hash function to the second dataset, the second condensed data comprising second hash values generated from the applying the hash function to the second dataset;

determining proportions of unique values in each of columns in the first dataset and the second dataset based on the first hash values and the second hash values;

estimating a degree of overlap between a column of the columns in the first dataset and a column of the columns of the second dataset based on the first hash values and the second hash values, and based on the proportions of entries having unique values in each of the columns in the first dataset and the second dataset;

determining parameters for any one or more of a left join, an inner join, an outer join, and a right join operation, the parameters comprising:
- numbers of rows to keep, match, or add from the first dataset; and
- numbers of rows to keep, match, or add from the second dataset,
- the determined parameters being based at least in part on the proportions of entries having unique values; and suggesting a join operation, from any one or more of the left join, the inner join, the outer join, and the right join, based on any of:
- the proportions of unique values in each of the columns; and
- the estimated degree of overlap;

computing a first relationship measure for the first dataset, the first relationship measure including the first condensed data;

computing a second relationship measure for the second dataset, the second relationship measure including the second condensed data;

computing a join key using the first relationship measure and the second relationship measure, and using the determined parameters, the join key representing a correspondence area between the first dataset and the second dataset; and selecting an operation, from any one or more of the left join, the inner join, the outer join, and the right join, based on the join key.

12. The method of claim 11, wherein the join operation is suggested based on an overlap suggestion measure based on the first relationship measure and the second relationship measure.

13. The method of claim 12, wherein the overlap suggestion measure comprises a null measure to identify a null portion of the first dataset or the second dataset.

14. The method of claim 12, wherein the overlap suggestion measure comprises one or more of: a first uniqueness measure configured to identify a first unique portion of the first dataset, and a second uniqueness measure configured to identify a second unique portion.

15. The method of claim 12, further comprising configuring an interactive user interface element to display the overlap suggestion measure.

16. The method of claim 11, wherein the correspondence area comprises one or more of:
- a left correspondence area configured to represent the first dataset and left matching data from the second dataset, the left matching data matching at least a portion of the first dataset;
- a right correspondence area configured to represent the second dataset and right matching data from the first dataset, the right matching data matching at least a portion of the second dataset;
- an inner correspondence area configured to represent inner matching data representing only an overlapping portion of the first dataset and the second dataset; and
- an outer correspondence area configured to represent outer matching data representing the first dataset and the second dataset.

17. The method of claim 11, wherein the first dataset comprises a first column of a first database of the one or more databases.

18. The system of claim 1, wherein the instructions further cause the system to perform:
computing a null measure of the first dataset and the second dataset based on the first hash values and the second hash values; and wherein the suggesting the join operation is based on the computed null measure, and wherein the determining, for the left join, the inner join, the outer join, and the right join operation, the numbers of rows to keep, match, or add from the first dataset and from the second dataset, is further based on the null measure of the first dataset and the second dataset.

19. The system of claim 1, wherein the instructions further cause the system to perform:
presenting:
- for the left join operation, a number of rows to keep from the first dataset and a number of rows to match from the second dataset;
- for the inner join operation, a number of rows to keep from the first dataset and from the second dataset;
- for the outer join operation, a number of rows to keep from the first dataset and a number of rows to add from the second dataset; and
- for the right join operation, a number of rows to keep from the second dataset and a number of rows to match from the first dataset.

20. The system of claim 1, wherein the instructions further cause the system to perform:
presenting, along with a graphical depiction:
- a number of rows of the first dataset having a match with corresponding rows of the second dataset;
- a number of rows of the first dataset not matching any rows of the second dataset; and
- a number of rows of the second dataset not matching any rows of the first dataset.

* * * * *